Feb. 28, 1967  E. H. OVERMAN, JR., ETAL  3,306,558
AIRCRAFT COMPASS SYSTEM CIRCUIT CONTROL JUNCTION BOX
Filed April 29, 1966

INVENTORS.
ERNEST H. OVERMAN, JR.
JACK M. CALVERT

BY *Kimmel, Crowell & Weaver*

ATTORNEYS.

INVENTORS.
ERNEST H. OVERMAN, JR.
JACK M. CALVERT

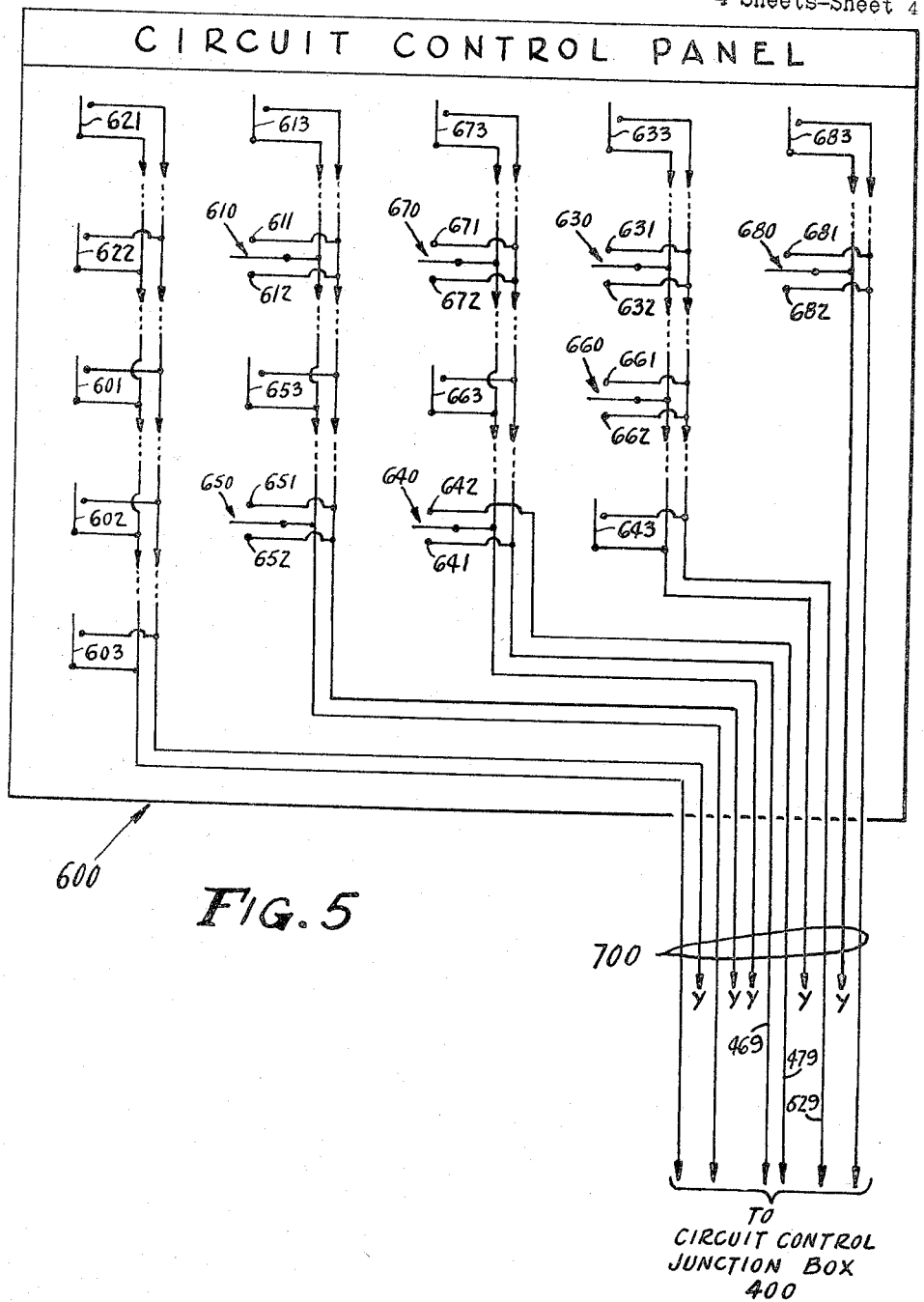

3,306,558
AIRCRAFT COMPASS SYSTEM CIRCUIT
CONTROL JUNCTION BOX
Ernest H. Overman, Jr., and Jack M. Calvert, both of
Abilene, Tex., assignors to Aerotronics Engineering,
Inc., Abilene, Tex., a corporation of Texas
Filed Apr. 29, 1966, Ser. No. 546,399
10 Claims. (Cl. 244—77)

This invention relates to aircraft navigational systems and in particular to a fail safe interconnection system between two independently operable compass systems in an aircraft. Specifically, the invention relates to an aircraft having two independently operable compass systems with a circuit controlled junction box interconnection system which includes a remotely controllable switching system for selectively interchanging and disabling individual components of the compass systems and for selectively feeding a reference signal from the compass systems to desired reference signal sensitive devices for providing navigational data.

It is common in today's long range aircraft to provide a plurality of position signals which relate the position of the aircraft to a point of reference. Such position signals may be derived from the well known magnetic compass. Such signals may also be derived from directional gyros. In the more modern aircraft, position signals are also derived from radar sensing systems. It is common to provide a single compass system for selectively feeding a reference signal which is characteristic of the heading of the aircraft to one or more systems which respond to the reference signal and provide navigational data for use by the personnel aboard the aircraft or for automatically controlling the flight of the aircraft.

It is known to equip aircraft with a back-up system in the event of a failure in the primary system.

The use of a back-up compass system or a second compass system which feeds a part of the navigational data equipment of the aircraft solves to a very limited extent one of the problems facing aircraft operators; namely, the failure of a primary compass system while the aircraft is in flight. The failure of the navigational system of an aircraft while it is in flight, particularly while it is over the uncharted ocean a long distance from the nearest land, is a very serious problem. If a pilot is required to rely entirely upon his visual observation of a magnetic compass for his heading information, he will very likely find himself lost because of the errors in reading such instruments, drift, wind, and other factors. Therefore, every effort is made to assure the dependability of more accurate navigational systems.

In spite of the long use and experience with electronic navigational systems and the problems attendant in the maintenance and operation of such systems, it has not heretofore been known or suggested to provide means for selectively interchanging the major components of two independently operable navigational systems. While the provision of a second independently operable back-up compass system provides a significant safety factor with respect to dependability, it has not heretofore been recognized that by interconnecting the two independently operable compass systems it would be possible to provide a safety factor many times greater than can be provided merely by the provision of a back-up compass system.

It is an object of this invention to provide an aircraft navigational system having two independently operable compass systems, means for interconnecting the major components of the two compass systems to a switching system for selectively interchanging the major components of each system electronically into the other system.

More specifically, it is an object of this invention to provide a circuit control junction box including a remotely operable switching system for selectively electronically switching major components of a first compass system into a second compass system and the major components of the second compass system into the first compass system and, further, providing remotely operable switching means for selectively disabling major components of first and second compass systems.

These and other objects will become apparent from the specification which follows, and from the drawings to which reference is made.

FIGURE 5 is a simplified schematic diagram of the circuit control panel and switching device controllers located in the circuit control panel for remotely selectively electronically interchanging and disabling major components of the compass system of FIGURE 2 and for selectively feeding heading reference signals to navigational data equipment of the aircraft of FIGURE 1.

Figure 1:
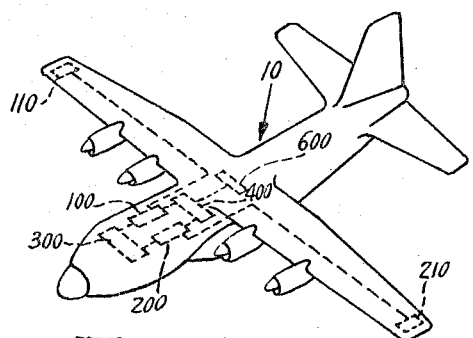
FIGURE 1 is an aircraft including two independently operable compass systems.

With reference now to FIGURE 1, the navigation system of this invention comprises a part of aircraft 10 which is usually a large cargo aircraft or bomber; however, systems of the type included in this invention may be used in smaller aircraft and particularly in experimental aircraft.

The system of this invention includes a first compass system including a plurality of major components which, in FIGURE 1, are shown generally as block 100 with the exception of a detector 110 located near the tip of a wing. The aircraft also includes a second compass system shown generally in block 200, again with the exception of a detector 210 near the tip of the wing of the aircraft. Both compass systems 100 and 200 feed a heading reference signal to one or more navigational control components of the navigational data system shown generally in the block 300. In normal operation, compass system 100 and compass system 200 operate independently of each other. In normal operation, the heading reference signal from compass system 100 is fed to selected components of the navigational data and control system 300 and the remainder of the components of the navigational data and control system 300 receives a heading reference signal from compass system 200. In the preferred embodiment, both the first and the second compass systems include a plurality of components which are electronically equivalent to analogous components in the other system, thereby permitting the components to be electronically interchanged by the system of this invention.

The first compass system 100 includes the following components: a compass amplifier supply 101 which merely provides a selected range of voltages and may be of any conventional type, detector 110 which may be of the type designated AERNO 60–1487, compass amplifier 120 which may be of the type AERNO 60–1523 (N–1), slaving control 130 which may be of the type designated AERNO 60–1525, directional gyro 140 which may be of the type designated AERNO 60–1521, master indicator 150 which may be of the type designated AERNO 60–1520 or AERNO 60–1530, and compass signal power amplifier 160 which may be of the type designated AERNO 60–3861 (ME–1). The individual components of the compass system do not, in their particular features, comprise this invention; rather, it is their interconnection and the system of selectively interconnecting and interchanging these components which form this invention. The individual components are described in T.O. 1C–130B–2–8 and other publications of the Air Force. Such devices are well known to those skilled in the art and will be described only as relates to their interconnection with the system.

In normal operation, power supply 101 provides power to all the major components of the navigational system through individual interconnection. Detector 110 provides a signal to the compass amplifier 120. The compass amplifier also receives a signal from the slaving control 130, which is based on the compass 132, and from the gyro 140. The output of the compass amplifier is fed to the master indicator 150 which gives a visual indication of the output of the detector, the slaving control, and the gyro through the compass amplifier 120. The output of the compass amplifier is also fed to the compass signal power amplifier for amplification from which it may be fed to the VHF systems, the auto-pilot, and the Doppler radar. The power amplifier thus serves only to amplify the output of the compass amplifier for driving additional components.

The compass system 200 is in all essential respects identical with the compass system 100 as described, and includes power supply 201, detector 210, compass amplifier 220, slaving control 230, directional gyro 240, master indicator 250, and compass signal power amplifier 260, which are the same type of components as the corresponding component of the first compass system 100. In addition to the compass system just described, the navigational equipment of the aircraft includes navigational data and control system components which include an auto-pilot system 370, a Doppler radar system 380 and VHF navigational systems 391 and 392. The auto-pilot 370 and the Doppler radar 380 are of the type conventionally used in military aircraft, for example the type designated as AN–APN–147, and which are described in T.O. 1C–130B–2–8 and other Air Force publications, the disclosure of which is incorporated herein. The VHF navigational systems may be of the type designated ID–251/ARN, which is also described in the previously referred to publication and other Air Force publications. The particular nature of these individual components forms no part of this invention except those which relate to the interconnection between the components. Reference is made to the named publication and to other publications of the Air Force relating to navigational systems for a description of the particular components.

Before describing in detail the interconnection of the components in the circuit control junction box 400 shown in FIGURE 2, the general scheme will be described. Each of the major components of the first compass system 100 is tied into the system so that even when the component is performing a function for the other compass system it may perform, in addition, the same function for the compass system to which it is normally tied. This connection will be seen from inspection of FIGURE 2. In addition, means are provided in the switching system which is included in the circuit control junction box 400 for switching the particular functions of the major components into the other navigational systems.

Referring now to the particular features of the drawing, the power supply 101 is connected to a cable 402 through a jumper and in the normal position a switch 406. In a similar manner the power supply 201 is connected to a cable 404 through a jumper and the contacts of a switch 408. The cables 402 and 404 are shown in a generalized manner for purposes of clarity. If power supply 201 should fail, it is possible by the operation of switch 406 to transfer the power from the power supply 101 to the second navigational system, thereby interchanging power supply 101 electronically for power supply 201. Similarly, the function of power supply 101 may be replaced by 201 by operation of the switching means 408. It will be realized, of course, that the lines indicate a multiplicity of circuits which are shown in general schematic only for purposes of clarity. The switching devices 406 and 408 are commonly relays and may be remotely controlled from circuit control panel 600 in a manner which will be described hereinafter.

The function of the detector 110 may be substituted for detector 210 by operation of switch 410 and the detector 110 may be replaced by detector 210 by operation of switching means 412 in the same manner as was described with relation to the power supplies 101 and 201.

This same switching scheme is carried out through switching devices 416 and 418 with respect to the compass amplifiers 120 and 220, switching devices 420 and 422 with respect to the slaving control circuits 130 and 230, switching devices 424 and 426 with respect to directional gyros 140 and 240, switching devices 428 and 430 with respect to master indicators 150 and 250 and switching devices 432 and 434 with respect to power amplifiers 160 and 260.

Before describing the interconnection to the navigational data and control systems 300, it should be pointed out that directional gyros 140 and 240 function to provide a heading reference signal with regard to a magnetic compass. The use of the magnetic compass as a source of positional data is indicated generally by indicator 132 in the first navigational system and indicator 232 in the second navigational system.

Figure 2:
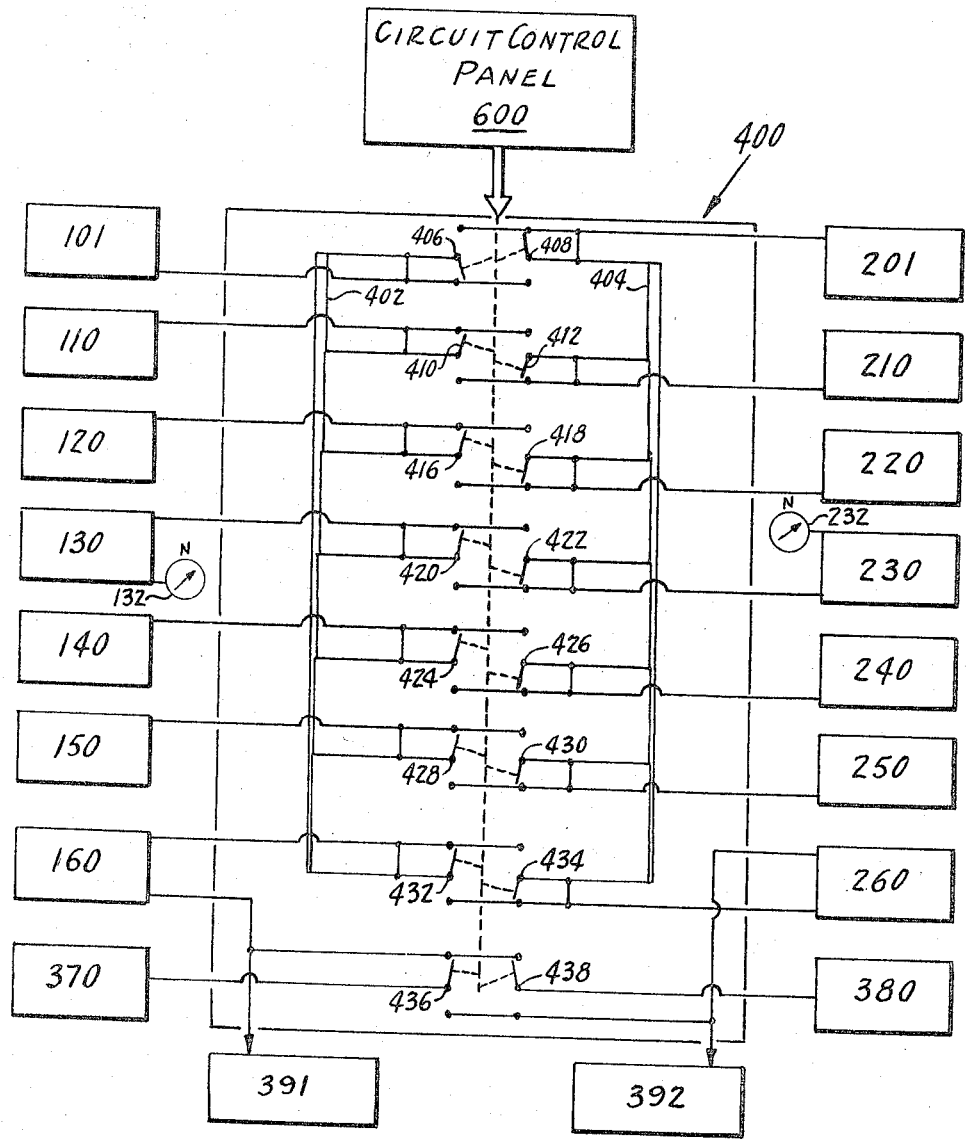
FIGURE 2 is a block diagram in partial schematic showing the general scheme of interconnection and switching of the components of the two compass systems in the aircraft of FIGURE 1.

The output of the power amplifier is fed in the preferred embodiment shown in FIGURE 2 directly to a VHF navigational system, and may be used to control a TACAN system in the manner normally provided in aircraft. Thus the heading reference signal from power amplifier 160 is fed directly to VHF navigational system 391 while the heading reference signal of power amplifier 260 is fed directly to VHF navigational system 392. While not shown in the preferred embodiment, it would, of course, be possible to selectively interchange the VHF navigational systems in the manner described with reference to the other systems.

The heading reference signal from power amplifier 160 is normally fed to both the auto-pilot system 370 and the Doppler radar system 380 as shown in FIGURE 2 by means of switching devices 436 and 438. It will be apparent, however, that by operation of either switch 436 or switch 438 the heading reference signal may be fed from power amplifier 260 to either or both the auto-pilot 370 and the Doppler radar 380.

The dotted line from the interconnection point of circuit control panel 600 running through the switching device system 406 to 438 indicates that each of the switching devices may be remotely controllable from circuit control panel 600. The manner of interconnection of the major components of the system, the switching devices of the system, and the remotely operable characteristics of the system will be more apparent from FIGURE 3.

As previously indicated, FIGURE 2 is only partially schematic in that it shows the switching devices as merely remotely controllable switches. The switching means are in the preferred embodiment remotely controllable relays; however, the relay structure is omitted in FIGURE 2 in order to more clearly show the function of the circuit control junction box 400.

Figure 3:
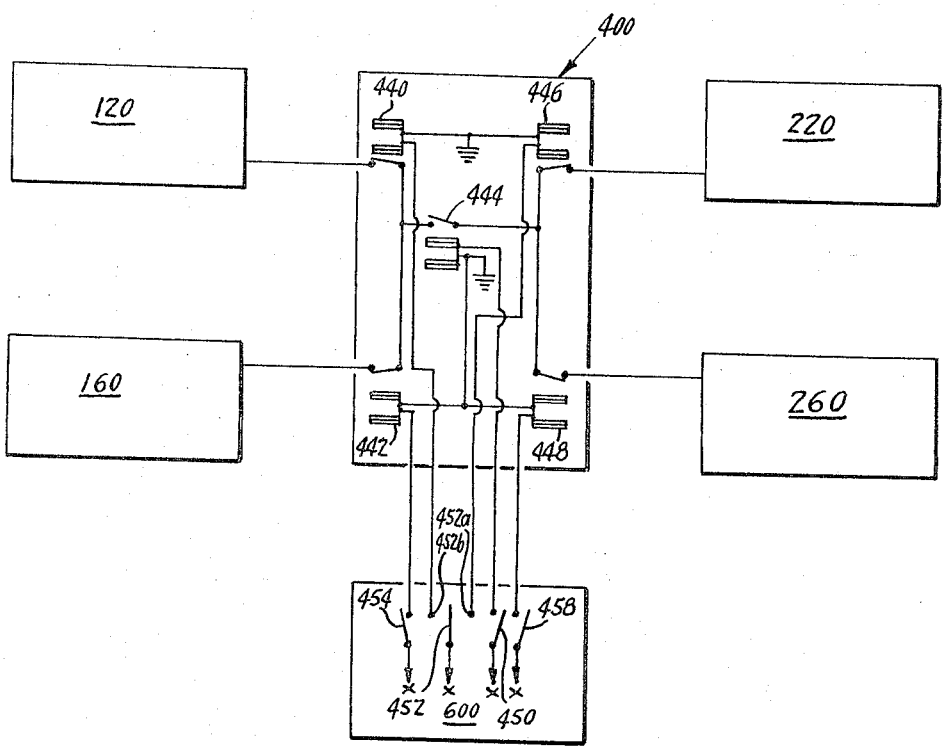
FIGURE 3 is a block diagram in partial schematic showing the remotely controllable switching means and remotely located switching device controllers of the system of FIGURE 2.

FIGURE 3 is a simplified schematic diagram showing remotely controllable switching means and remotely located switching means controllers. FIGURE 3 shows only two of the major components of the compass systems interconnected with circuit control junction box 400; however, it will be understood that all the major components of the compass systems are interconnected with the switching system of circuit control junction box 400 in the manner shown in FIGURE 3. In FIGURE 3, the single lines from the major components are representative of the multiplicity of interconnections which are necessary between each of the major components. Each other circuit would be switched in the manner shown in FIGURE 3.

Referring now with particularity to FIGURE 3, compass amplifiers 120 and 220 are shown interconnected with the switching system of the circuit control junction box 400. Compass signal power amplifiers 160 and 260, similarly, are shown interconnected with circuit junction box 400. In the exemplary circuit shown in FIGURE 3, the signal from compass amplifier 120 is fed through the contacts of relay 440 and the contacts of relay 442 to the compass signal power amplifier 160. The signal is also applied to the open contact of relay 444; however, in the normal operating position, as shown in FIGURE 3, the signal is applied only to the compass signal power amplifier 160. In a similar manner, the signal from compass amplifier 220 is fed through the contacts of relay 446 and the contacts of relay 448 to compass signal power amplifier 260. The signal, as will be observed from FIGURE 3, is also applied to the open contact of relay 444. The contacts are shown in the normal operating position in FIGURE 3, and it will be apparent that in the normal position the major components of the first compass system 100 are interconnected and the major components of the second compass system 200 are interconnected, but there is no connection between the first and the second compass systems 100 and 200.

The position signal from compass amplifier 120 may selectively be applied to the compass signal power amplifier 260 through the contacts of relay 440 merely by remotely actuating relay 444 by closing switch 450, thereby connecting the solenoid of relay 444 to a source of voltage shown generally at X. The source of voltage in an aircraft is generally 24-28 volts D.C.

It would generally be desirable to disable compass amplifier 220 in order to prevent an interfering signal therefrom. This is done by actuating relay 446 by means of switch 452, closing contact 452a thereby applying a voltage to the solenoid of relay 446. This opens the circuit to the compass amplifier 220 and prevents any spurious signal from disrupting the radar navigational systems. It will be seen in this position the position signal from the compass amplifier 120 is fed both to the compass signal power amplifier 160 and the compass signal power amplifier 260 making it thereby possible for both compass systems 100 and 200 to function in the normal manner.

If it should be desired to feed the position signal from compass amplifier 120 only to the compass signal power amplifier 260, the compass signal power amplifier 160 may be disabled by remotely operating switch 454, actuating relay 442 and opening the contacts which lead to compass signal power amplifier 160. In this position, it will be seen that compass amplifier 120 has been interchanged with compass amplifier 220 and substituted therefor in the second compass system 200.

In a similar manner, the position signal from compass amplifier 220 may be fed through the contacts on relay 446, the contacts on relay 444, and the contacts on relay 442 to the compass signal power amplifier 160. It would generally be desirable when feeding the position signal from the compass amplifier 220 to the compass signal power amplifier 160 to disable the compass amplifier 120 by actuating relay 440 by means of switch 452, closing contacts 452b. If it was desired to feed a signal only to compass amplifier 160, compass signal power amplifier 260 could be disabled by actuating relay 448 by means of switch 458.

While relays 440, 442, 446 and 448 are included as disabling relays, it will be understood that it is not necessary to include such a disabling relay in every circuit which interconnects the major components of the two compass systems with the circuit control junction box. Only those circuits necessary to accomplish the disabling of the individual major components of the compass systems are connected through such disabling relays.

It will be seen then, from FIGURE 3, that it is possible remotely to electronically substitute a compass amplifier from the first compass system 100 for the analogous compass amplifier 220 of the second compass navigational system 200 and, similarly, to substitute the compass amplifier 220 of the second compass navigational system 200 for the analogous compass amplifier 120 of the first compass navigational system 100. It is possible by means of the circuit control junction box 400 and the circuit control panel 600 and the interconnecting means to interchange major components of the two compass navigation systems in the sense that a major component of one system may be electronically substituted for the analogous major component of the other system. While the example of FIGURE 3 shows only the interchanging of compass amplifiers and/or compass signal power amplifiers, it will be understood that any other pair of analogous major components may similarly be interchanged in the sense that a major component of the first compass navigational system may be interchanged for the analogous component of the second compass navigational system or vice versa.

As previously explained, the schematic of FIGURE 3 shows only the switching system as applied to single circuits; however, it will be understood that the switching system of the circuit control junction box 400, as controlled by the circuit control panel 600, includes means for switching a multiplicity of individual circuits and thereby switching a plurality of major components providing means for interchanging major components of one compass system for the analogous component of the second compass system.

It is, of course, not necessary that each relay be individually remotely operable as shown in FIGURE 3. In the preferred embodiment, means are provided for remotely actuating a plurality of relays by a single switching means controller. Such a switching system is shown in FIGURE 4.

Figure 4:
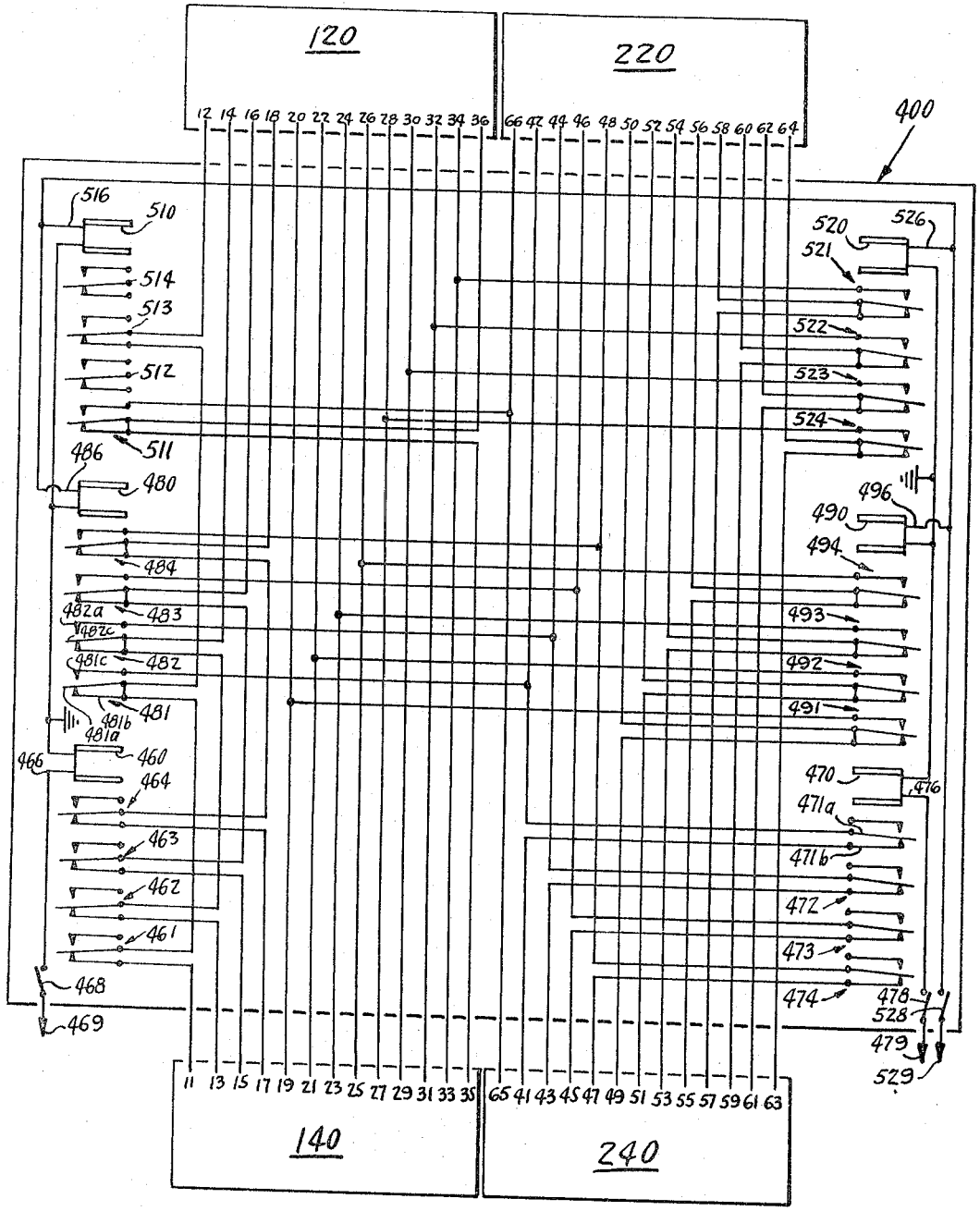
FIGURE 4 is a schematic diagram of an exemplary switching system for selectively interchanging and disabling major components in the compass system of FIGURE 2.

FIGURE 4 is a specific embodiment of the switching system of the circuit control junction box as applied to the interconnection between the major components, directional gyros 140 and 240 and compass amplifiers 120 and 220.

Circuit control junction box 400 includes a circuit system, a part of which is shown in FIGURE 4. The circuit system shown in FIGURE 4 includes disabling relays 460 and 470 which function in a manner generally described with relation to relays 440, 442, 446 and 448 in FIGURE 3. The circuit system includes, in addition, switching relays 480, 490, 510 and 520. These switching relays perform a function generally described previously with regard to relay 444 in FIGURE 3.

In order to more easily describe the system, the numbering system of the lines and components will be briefly described. Line 11 of directional gyro 140 is ultimately connected to line 12 of compass amplifier 120. Line 13 of directional gyro 140 is ultimately connected to line 14 of compass amplifier 120. Line 41 of directional gyro 240 is ultimately connected to line 42 of compass amplifier 220. Thus, every odd numbered line of directional gyros 140 and 240 ultimately is connected to the next larger even number in compass amplifiers 120 and 220.

With regard to the interconnection switching lines of the first compass system 100 including components 120 and 140 and the second compass system 200, including components 220 and 240, the following plan of numbers is used. Line 11–12 of the first compass system may selectively be connected to line 41–42 of the second compass system. Line 21–22 of the first compass system may selectively be connected to line 51–52 of the second compass system. Thus, by adding 30 to the number of the line in the first compass system, one may determine the line of the second compass system to which the first line is selectively switchably interconnected.

In normal operation, when compass system 100 is operated separately from compass system 200, a circuit is completed from line 11 in directional gyro 140 through closed contact 461 on relay 460 and through the jumper between contacts 481a and 481b of relay 480 and contacts 513 of relay 510 to line 12 in compass amplifier 120. In a similar manner a circuit is completed from line 13 through contacts 462 and 482 to line 14, from line 15 through contacts 463 and 483 to line 16, and from line 17 through contacts 464 and 484 to line 18. In the specific embodiment, it is necessary only that four of the lines be opened in order to disable the directional gyro 140. Thus, in the specific embodiment where the directional gyro is of the type designated AERNO 60–1521, as described in T.O. 1C–130B–2–8, published by the Air Force, line 11–12 would be the ground circuit between the directional gyro 140 and compass amplifier 120, which, in the specific example, is of the type designated AERNO 60–1523 (N–1), a described in T.O. 1C–130B–2–8. Lines 13–14, 15–16, and 17–18, would, in the specific example, interconnect the directional gyro rotor with the compass amplifier. Thus the opening of the contacts on relay 460 would disable the directional gyro rotor and consequently the directional gyro. It is, therefore, not necessary to interrupt the circuit completed between lines 19–20 through 35–36. These lines, as seen in FIGURE 4, extend directly between the directional gyro 140 and the compass amplifier 120.

In a similar manner directional gyro 240 may be disabled by the opening of the contacts on relay 470, thereby interrupting the circuits 41–42, 43–44, 45–46 and 47–48. These circuits would correspond to the ground and motor circuits in the manner described with reference to directional gyro 140. Similarly, it is unnecessary in the second compass system to include disabling relays in the circuits 49–50 to 65–66.

If it is desired to operate both the first and second compass systems, 100 and 200, with reference to a signal from directional gyro 140, it is necessary only to operate switching relays 480, 490, 510 and 520. Directional gyro 240 would, in this case, normally be disabled by actuation of relay 470.

Thus, the directional gyro 140 may be interchanged electronically for the directional gyro 240. A circuit is completed between line 11–12 through contact 481a and 481c, which would be closed upon actuation of relay 480, to line 41–42 in the second compass system, 200. In a similar manner the circuit 13–14 would be completed to line 43–44 through contacts 482a and 482c. The interconnections of lines 15–16 and 17–18 would similarly be completed through the contacts on relay 480 to lines 45–46 and 47–48 respectively. In a similar manner the line 35–36 would be interconnected to line 65–66 through contacts 511 on relay 510. The interconnection of lines 19–20 through 33–34 of compass system 100 to lines 49–50 through 63–64 of compass system 200 is accomplished in a similar manner with respect to the contacts of relays 490 and 520.

It is apparent, then, that if relays 480, 490, 510, and 520 are simultaneously actuated and disabling relay 470 is actuated, directional gyro 140 is electronically interchanged with, or substituted for, directional gyro 240. It is, of course, necessary that directional gyros 140 and 240 be electronically equivalent. By electronically equivalent, it is intended that not only the components perform the same general function but that the electronic interconnection be equivalent.

Similarly, directional gyro 240 may be interchanged for directional gyro 140 by actuation of the switching relays 480, 490, 510, and 520 and by actuation of the disabling relay 460. Thus, even if more than one component of each of the compass systems, 100 and 200, should fail at the same time, the compass systems may be maintained in an operative condition. If, for example, compass amplifier 120 were to fail and if directional gyro 240 were to fail the compass system may be maintained fully operative using directional gyro 140 and compass amplifier 220. While it is possible for both compass amplifiers 120 and 220 to fail at the same time, the probability of a total failure by the simultaneous failure of two analogous components in the two compass systems is extremely low. Where only a primary compass system is used with a stand-by, it is necessary only that any single component of the first system and any single component of the back-up system become inoperative at the same time and the aircraft is wholly without precise navigational equipment. The function of this invention, then, is to maintain the radar and compass navigational systems in an operative condition in spite of the failure of a plurality of components in both compass systems at the same time.

Referring again to the circuit control junction box as shown in FIGURE 4, it will be seen that disabling relay 460 may be actuated by applying a voltage through line 466 to the solenoid of relay 460. This may be done by closing switch 468 if the arrow indicated at 469 leads to a source of voltage. The interconnection of line 469, which leads to the circuit control panel 600, will be described hereinafter. In a similar manner relay 470 may be actuated by applying a voltage to line 476 by means of switch 478 applying a voltage from the arrow indicated at 479. Relays 480, 490, 510, and 520 are simultaneously actuatable by the application of voltage to lines 486, 496, 516 and 526 respectively, by operation of switch 528 leading to a source of voltage at 529.

It is also apparent that as switches 468, 478 and 528 are maintained in the closed position, relays 460, 470, 480, 490, 510 and 520 may selectively be actuated remotely by the application of voltage to lines 469, 479 and 529. This remote actuation of the disabling and switching relays of the circuit control junction box 400 is the function of the switching device controllers in the remotely located circuit control panel 600 which will be described now.

FIGURE 5 is a simplified schematic diagram of the switching device controller circuits of the circuit control panel 600. Not all the individual interconnecting lines are included for purposes of clarity.

Reference will first be made to the switching device controllers for the specific embodiment of the switching system shown in FIGURE 4. The switching controllers connected with these circuits are 640 having contacts 641 and 642 and controller 643. The movable contact of controllers 640 is connected by means of cable 700 to a source of operating voltage shown generally at Y. The operating voltage Y may be any convenient source of power in the aircraft, and is quite generally a 28 volt D.C. source of power.

The switches in the circuit control panel 600 are shown in their normal position.

It will be seen then, that in the normal position no voltage is applied to either contact 641 or contact 642 of switching device controller 640. The lines from contacts 641 and 642 lead through cable 700, which divides into two portions, part of the cable lines leading to the power source, usually through a fuse not shown, and part of the lines leading to the circuit control junction box 100. As indicated on FIGURE 5, the contact 641 is connected to line 469, which leads through switch 468 to solenoid 460 as shown in FIGURE 4. In a similar manner contact 642 is connected to line 479 which leads through switch 478 to relay solenoid 470 shown in FIGURE 4. Thus, either relay 460 or relay 470 may be actuated remotely by operation of switch device controller 640, which normally is in the form of a switching unit or switch.

The selected function in circuit control junction box 400 which are performed by relays 480, 490, 510, and 520, may be controlled by switching device controller 643. In the normal position no voltage is applied through controller 643 to line 529 and through switch 528 to the solenoids of the selecting relays. These selecting relays 480, 490, 510, and 520, may be actuated remotely by closing controller 643 thereby applying a voltage through point 529 in switch 528 to the solenoids of these relays.

As previously indicated, not all the lines are individually shown for purposes of clarity; however, the controllers for the balance of the switching functions are connected and operate in a manner just described for controllers 640 and 643.

With reference again to FIGURE 5, the functions of the switching controllers will be described as related to the major components. Switch 621 is the disabling switch for the compass amplifier 120 and switch 622 is the disabling switch for compass amplifier 220. Switching means 601 is the switch controller for the selection of compass power amplifiers and in the normal position as shown, power amplifier 160 is connected in only the first compass system and power amplifier 260 is connected only in the second compass system. When switching device controller 601 is closed, however, the compass power amplifiers 160 and 260 are electronically interconnected and, if the analogous component is disabled, are electronically interchanged. Switching device 602 when closed disables compass power amplifier 160 while switching device 603 when closed disables compass power amplifier 260.

Closing of switch 613 electronically interchanges detector 110 and detector 210 while the closing of contacts 610–611 disables detector 110 and closing of contacts 610–612 disables detector 210.

The closing of contacts 653 electronically interchanges master indicators 150 and 250, while the closing of contacts 650–651 electronically disables master indicator 150 and the closing of the contacts 650–652 electronically disables master indicator 250.

Closing of contacts of switch 673 selectively controls feeding a heading reference signal from power amplifier 260 rather than power amplifier 160 as in the normal position shown. Switch 670 having contacts 671–672 will switch No. 1 auto-pilot circuit to No. 2 compass amplifier. The same is true with the Doppler circuit. The electronic cut-out would, however, operate in the manner previously described with respect, for example, to the detector cut-out system.

Switch 663 is the selector switch for the compass signal power amplifier and when operated electronically interchanges compass signal amplifier 160 with signal power amplifier 260 in the manner previously described. Switch 660 with contacts 661 and 662 electronically disables signal power amplifiers 160 and 260 in the manner described. The functions and operation of switch 640 with contacts 641 and 642 and switch 643 have been described with respect to the specific embodiment.

Switch 633 is the switching system for the slaving control and switch 630 with contacts 631 and 632 operates electronically to disable the respective slaving controls 130 and 230.

The switch 683 is the selector switch for selectively feeding a heading reference signal to the Doppler radar system from either compass amplifier 160 or amplifier 260 as may be desired. Switch 680 having contacts 681 and 682 is available as an electronic disabling switch where Doppler radar systems are used. Only one Doppler radar system is shown in FIGURE 2 for purposes of clarity; however, it will be understood that the interconnection of a plurality of such radar systems would be the same as has been described with regard to the previously mentioned major components.

It is, of course, unnecessary to describe the specific interconnection of each of the components since the interconnection will be dependent upon the nature of the component and must be determined from the specifications of the particular component being interconnected into this system. However, it should be pointed out that whatever the major component is, the analogous functional circuits of each must be interconnected into a single switching system, for example, referring to the directional gyro system, the directional gyro signal of the gyros 140 and 240 would be connected to a single set of contacts. In a similar manner, the take-off signal for the two gyros would be connected to a single set of contacts. Similarly, the signal take-off rotor, leveling take-off rotor, leveling take-off stator, and leveling torquer connections of the first directional gyro would be connected to the analogous circuits of the second directional gyro through a selectively closable pair of contacts. The connection points necessary for making any desired interconnection may be obtained from the technical manuals or descriptive material accompanying any major component.

In the specific example the switching devices used in the circuit control junction box 400 are contact relays. It will be seen, however, that the exact nature of the relays is not an essential part of this invention. It would be possible, but impractical, to provide an individual relay for each circuit or, on the other hand, to provide relays having more switching poles than are shown in the preferred embodiment. The nature of the switching devices will be determined by the number of identical switching functions which must be performed.

Similarly, the switching controllers of the circuit control panel 600 may comprise merely toggle switches; moreover, they may be, in addition, comprised of various special types of toggle switches, for example, including indicator lights or additional signalling devices. The particular nature of these controllers is not an essential part of this invention but rather it is necessary that they perform the function indicated schematically on FIGURE 5.

It would, of course, be possible in some circuits and may be advisable as such devices are perfected to replace mechanical switching devices with solid state or other types of switching devices and controllers. It has been shown then that the invention resides in an aircraft having first and second independently operable compass systems, the major components of each of the systems being electronically equivalent to the analogous component of the other system and each of the systems including sensing means, for example, directional gyros, magnetic compasses, compass detectors, and other devices for deriving a position signal which is characteristic of the position of the aircraft relative to point of reference. The systems each include, in addition, signal responsive means which are operatively connected to sensing means for providing a heading reference signal for the aircraft. In the preferred embodiment this comprises a power amplifier. The invention also includes interconnection with a means for providing navigational data and control to the aircraft. Such systems may include VHF navigational systems, Doppler radar systems, search radar systems, auto-pilot and other systems. The invention includes a multiplicity of switching devices in a circuit control junction box forming a switching system which may be remotely controlled and which connects any one of a plurality of major components to be substituted for or interchanged with an analogous component of a second navigational system. The switching system which is remotely controllable from a circuit control panel also provides means for selectively feeding navigational reference signals between the selected major components of each of the navigational systems. The system also includes means which are remotely located from the circuit control junction box for operating the switching system of the junction box from a remote position.

The new results which flow from this invention will be apparent from the foregoing description and from the drawings. It will be clear that the system provides a tremendous additional margin of safety over the systems of the prior art.

We claim:

1. In an aircraft having first and second independently operable navigation systems, major components of each of said systems being electronically equivalent to the analogous component of the other of said systems, each system including sensing means for deriving a position signal characteristic of the position of the aircraft relative to a point of reference, signal responsive means operatively connected to the sensing means for providing a heading reference signal for the aircraft and means responsive to the heading reference signal for providing navigational data; the improvement comprising a circuit control junction box, a switching system comprising a multiplicity of switching devices in said circuit control junction box, a plurality of said switching devices being remotely controllable, means interconnecting a plurality of the major components of the independently operable navigation systems to a plurality of the switching devices in the circuit control junction box, a circuit control panel, switching device controllers in said panel for controlling the remotely controllable switching devices for electronically interchanging any selected major component of a first navigation system for an equivalent major component of a second navigation system and for selectively feeding navigational reference signals between selected major components of each of the navigation systems and means interconnecting the circuit control panel switch device controllers and the remotely controllable switching devices in the circuit control junction box.

2. The invention of claim 1 wherein the signal responsive means for providing a heading reference signal in the first and second navigation systems comprises a first compass signal power amplifier and a second compass signal power amplifier and includes means interconnecting the first and second compass signal power amplifiers with the switching system in the circuit control junction box and means included in said switching system for selectively electronically interchanging and disabling the first and second compass signal power amplifiers.

3. The invention of claim 2 wherein the first compass navigational system includes a first compass detector and a first compass amplifier, the second compass navigational system includes a second compass detector and a second compass amplifier, means connecting the first and second compass amplifiers to the switching system in the circuit control junction box and wherein said switching system includes switching means for electronically replacing the first compass amplifier in the first navigation system with the second compass amplifier, switching means for electronically replacing the second compass amplifier in the second navigation system with the first compass amplifier and switching means for selectively electronically disabling the first and second compass amplifiers.

4. The invention of claim 1 wherein the sensing means includes a first directional gyro and a second directional gyro, means interconnecting the first and second directional gyros with the switching system in the circuit control junction box and wherein said switching system includes means for selectively electronically interchanging the first and second directional gyros and means for selectively electronically disabling the first and second directional gyros.

5. The invention of claim 1 including a first magnetic compass navigation system which includes a first slaving control component, a second magnetic compass navigation system which includes a second slaving control component, means interconnecting the first and second slaving control components with the switching system in the circuit control junction box, and wherein the switching system includes switching means for selectively electronically interchanging the first and second slaving control components and means for selectively electronically disabling the first and second slaving control components.

6. The invention of claim 1
wherein the first compass navigational system includes a first compass detector and a first compass amplifier,
wherein the second compass navigational system includes a second compass detector and a second compass amplifier,
means interconnecting the first and second compass amplifiers with the switching system in the circuit control box,
switching means in said switching system for selectively electronically interchanging and disabling the first and second compass amplifiers, wherein the sensing means include
a first directional gyro,
a second directional gyro,
means interconnecting the first and second directional gyros with the switching system in the circuit control box,
switching means in said switching system for selectively electronically interchanging and disabling the first and directional gyros,
a first magnetic compass navigational system including a first slaving control component,
a second magnetic compass navigational system including a second slaving control component,
means interconnecting the first and second slaving control components with the switching system in the circuit control box,
switching means in said switching system for selectively electronically interchanging and disabling the first and second slaving control components, and wherein the navigational systems include
a first compass signal power amplifier,
a second compass signal power amplifier,
means interconnecting the first and second compass signal power amplifiers with the switching system in the control box, and
switching means in said switching system for selectively electronically interchanging and disabling the first and second compass signal power amplifiers.

7. The invention of claim 6 wherein the means responsive to the heading reference signal for providing navigational data includes an auto-pilot system, and wherein the invention includes means interconnecting the auto-pilot system with the switching system in the circuit control junction box and wherein said switching system includes switching means for selectively electronically feeding a heading reference signal to the auto-pilot system from the first compass signal power amplifier or from the second compass signal power amplifier.

8. The system of claim 7 wherein the means responsive to the heading reference signal for providing navigational data includes a Doppler radar system and wherein the invention includes means interconnecting the Doppler radar system with the switching system in the circuit control junction box and wherein said switching system includes switching means for selectively electronically feeding a heading reference signal to the Doppler radar system from the first compass signal power amplifier or from the second compass signal power amplifier.

9. The system of claim 8 in which substantially all switching means are remotely controllable by the switching device controllers in the circuit control panel.

10. The invention of claim 1 wherein the first and second navigational systems include first and second compass signal power amplifiers, wherein the means responsive to the heading reference signal for providing navigational data includes an auto-pilot system, and wherein the navigational systems include means for connecting the auto-pilot system with the switching circuit in the circuit control junction box and wherein said switching system includes switching means for selectively electronically feeding a heading reference signal to the auto-pilot system from the first compass signal power amplifier or from the second compass signal power amplifier.

References Cited by the Examiner

UNITED STATES PATENTS

| | | | |
|---|---|---|---|
| 3,071,336 | 1/1963 | Fearnside | 244—77 |
| 3,145,330 | 8/1964 | Hecht | 318—19 |
| 3,190,586 | 6/1965 | Righton | 244—77 |

FERGUS S. MIDDLETON, *Primary Examiner.*